Figure 1:
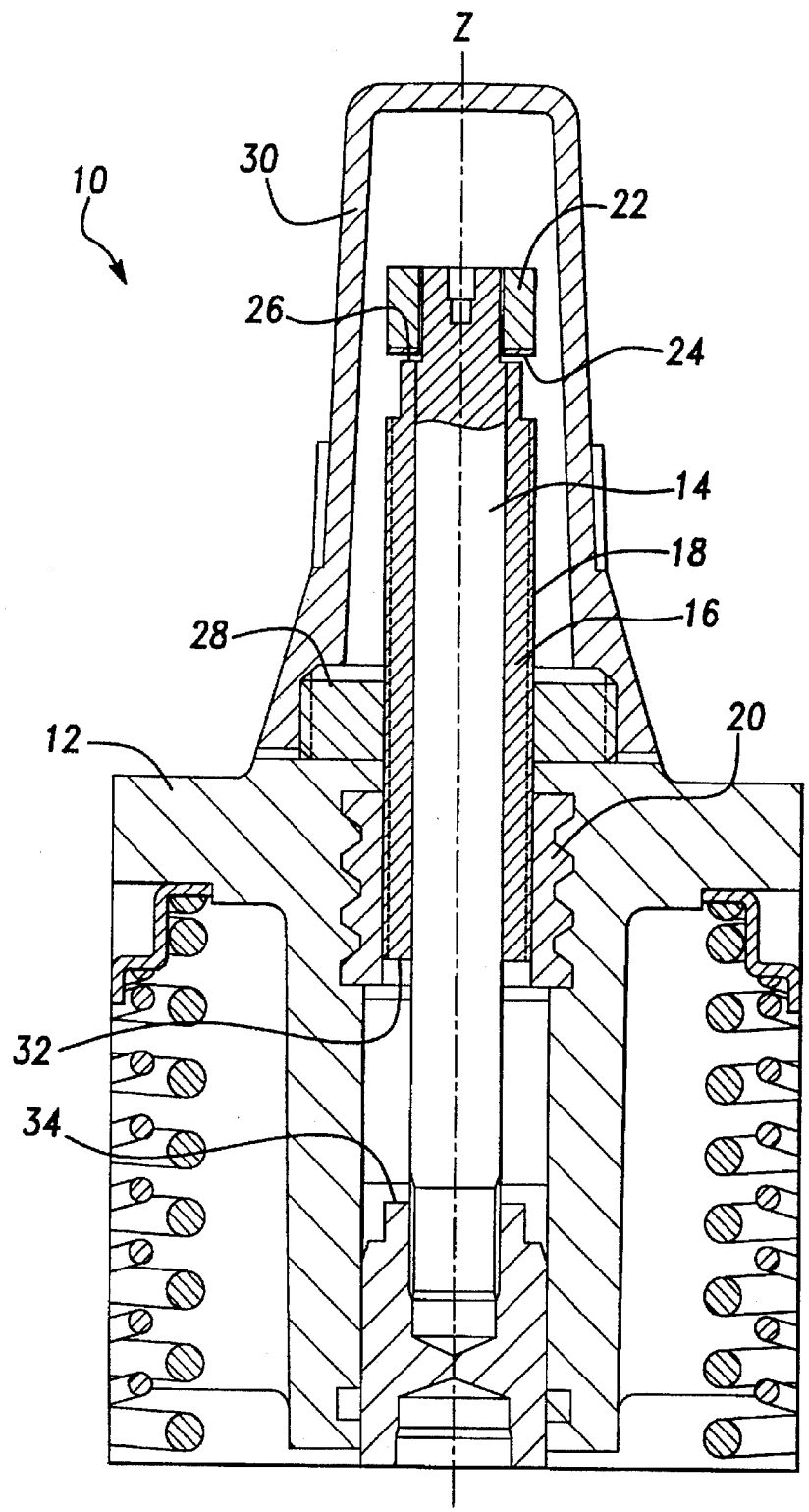

United States Patent [19]
Heiniger et al.

[11] Patent Number: 5,647,397
[45] Date of Patent: Jul. 15, 1997

[54] DIAPHRAGM VALVE

[75] Inventors: Martin Heiniger, Schaffhausen, Switzerland; Walter Bannwarth, Lauchringen, Germany

[73] Assignee: Georg Fischer Management AG, Switzerland

[21] Appl. No.: 492,395

[22] Filed: Jun. 19, 1995

[30] Foreign Application Priority Data

Jun. 20, 1994 [CH] Switzerland .................. 01944/94

[51] Int. Cl.$^6$ ................................. F16K 37/00
[52] U.S. Cl. ................. 137/559; 137/556; 251/285; 251/291
[58] Field of Search ................... 137/556, 559; 251/285, 291

[56] References Cited

U.S. PATENT DOCUMENTS

| | | | |
|---|---|---|---|
| 421,308 | 2/1890 | Reynolds | 251/285 |
| 685,396 | 10/1901 | Dexter | 251/285 |
| 3,486,734 | 12/1969 | Works et al. | 251/285 |
| 3,946,756 | 3/1976 | Specht | 251/285 |
| 4,099,703 | 7/1978 | Lush | 251/285 |
| 4,489,756 | 12/1984 | Balz | 251/285 |
| 4,676,268 | 6/1987 | Sano | 137/556 |
| 5,102,094 | 4/1992 | Washam et al. | 251/285 |

FOREIGN PATENT DOCUMENTS

| | | | |
|---|---|---|---|
| 682057 | 11/1952 | United Kingdom | 137/556 |

*Primary Examiner*—A. Michael Chambers
*Attorney, Agent, or Firm*—Gifford, Krass, Groh, Sprinkle, Patmore, Anderson & Citkowski, P.C.

[57] ABSTRACT

In a pneumatically or hydraulically actuated valve, in particular, a diaphragm valve, that comprises a valve body that can be actuated via a coupling rod (14), the coupling rod (14) is held in the corresponding position for adjusting a minimum flow cross section via an adjustable limit stop. The coupling rod (14) passes through the housing cover (12) of a valve housing (10) and serves as an indicator for the valve position.

The coupling rod (14) is guided in a sliding fashion inside a sleeve (16), with said sleeve (16) engaging with a threaded bushing (20) that is connected with the housing cover (12) in a fixed manner via an external thread (18), and with said sleeve being able to be displaced in its axial direction (z) by means of a screw-turning motion. A limit stop part (22) that can be brought into contact with the face side (26) of the sleeve (16) situated opposite the valve body is fixed on the free end of the coupling rod (14). The limit stop part (22) is preferably fixed on the coupling rod (14) such that its position can be adjusted.

Due to the possibility of adjusting the sleeve (16) as well as the limit stop part (22) on the coupling rod (14), it is possible to adjust the open as well as the closed actuating position of the valve and actuate the valve between a preadjusted minimum and a preadjusted maximum flow cross section.

8 Claims, 2 Drawing Sheets

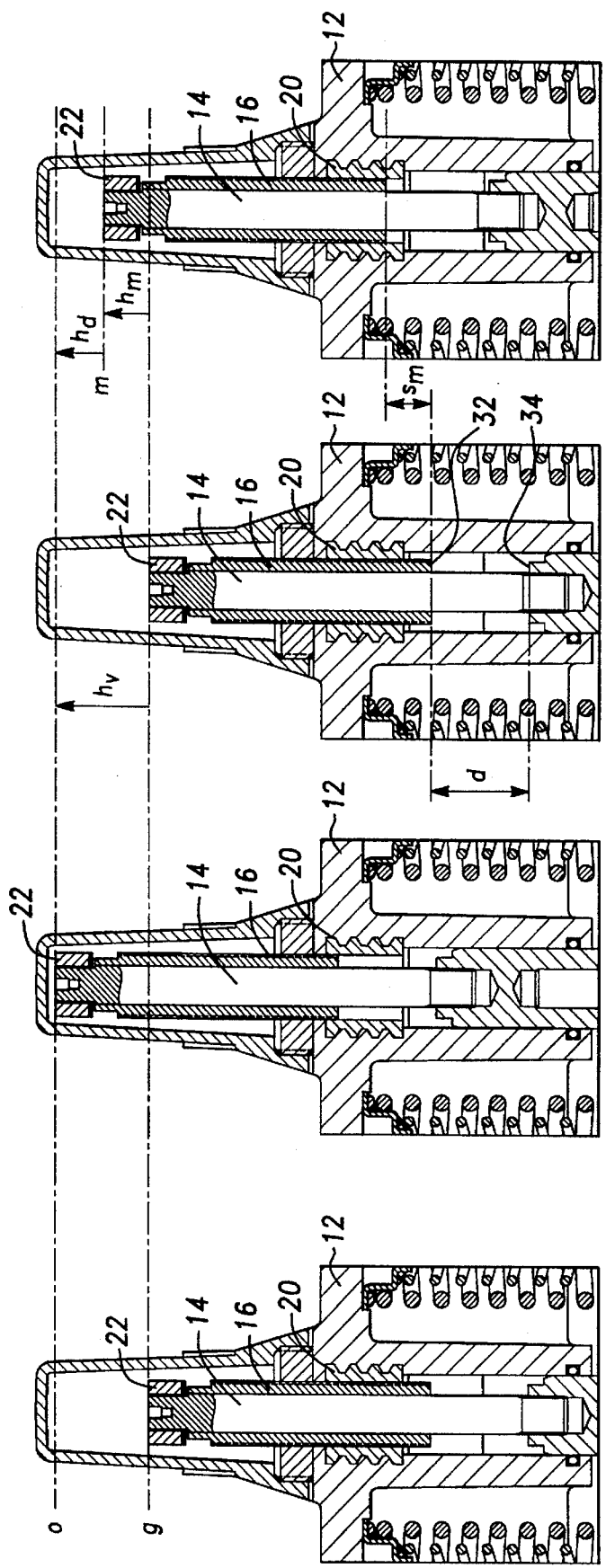

DIAPHRAGM VALVE

The invention pertains to a pneumatically or hydraulically actuated valve, in particular a diaphragm valve, which comprises a valve body that can be actuated via a coupling rod, wherein the coupling rod is held in the corresponding position for adjusting a minimum flow cross section via an adjustable limit stop, and wherein said coupling rod passes through the cover of the valve housing and serves as an indicator for the valve position.

A diaphragm valve of the initially mentioned type is known from DE-U-9,207,226. According to this publication, the coupling rod is directly connected with a bushing that simultaneously serves as an adjustable limit stop for adjusting the minimum flow cross section with an external thread. The maximum flow cross section can be selectively adjusted instead of the minimum flow cross section by means of a second limit stop of the bushing. One significant disadvantage of this known diaphragm valve can be seen in the fact that the housing cover needs to be removed in order to adjust the valve position. In addition, the two limit stops cannot be adjusted independently from one another, so a simultaneous preadjustment of the minimum and the maximum flow cross section is not possible.

In light of these circumstances, the inventor has made it the objective of this invention to disclose a valve of the initially mentioned type in which a preadjustment of the minimum flow cross section can be carried out in a simple fashion without having to open the housing cover. In addition, it should be possible to easily ascertain the operating state of the valve at any time.

According to the invention, this objective is attained by the fact that the coupling rod is moved by a sleeve that engages with a threaded bushing connected to the housing cover in a fixed manner via an external thread and can be displaced in its axial direction by means of a screw-turning motion, and that a limit stop part, which can be brought into contact with the face side of the sleeve situated opposite the valve body, is fixed on the free end of the coupling rod.

Due to the arrangement of a limit stop part on the free end of the coupling rod according to the invention, the position of the actuator is visible from the outside and the stroke and consequently the opening position of the valve can be measured. Depending on the turning direction, the stroke limitation of the open or closed actuating position can be limited by turning the sleeve inside the threaded bushing. The maximum flow cross section can be adjusted by screwing the sleeve into the threaded bushing, with the minimum flow cross section being adjusted accordingly by unscrewing the sleeve from the threaded bushing.

According to one suitable embodiment of the valve according to the invention, the limit stop part is fixed on the coupling rod such that its position can be adjusted, wherein according to one preferred equipment embodiment, the coupling rod is realized as a threaded rod at least within the region of the limit stop part such that the position of the limit stop part on the coupling rod can be adjusted by means of a screw-turning motion. Due to this additional possibility for adjusting the limit stop part on the coupling rod, it is possible to simultaneously adjust the open as well as the closed actuating position such that the valve can be actuated between the preadjusted values for a minimum and a maximum flow cross section.

In order to adjust the minimum flow cross section, the coupling rod is preferably connected in a fixed manner with the limit stop surface that serves as a limit stop for the face side of the sleeve which faces the valve body.

In order to reduce the frictional resistance between the limit stop part and the sleeve while turning the sleeve inside the threaded bushing, the limit stop part can be provided with an antifriction coating. Instead of an antifriction coating, it is also possible to utilize a wearing disk or intermediate disk consisting of a material with sliding properties or an antifriction bearing.

The part of the coupling rod with the limit stop part that passes through the cover of the housing as well as part of the sleeve is preferably covered by a transparent dome that is attached onto the housing.

Diaphragm valve actuators operate in accordance with three functions, namely:

FC (fail close) the spring force acts in the closing direction

FO (fail open) the spring force acts in the opening direction

DA (double acting) double acting

In all three different variations, the closing movement is realized by a force that acts upon the diaphragms via the pressing spindle. The force of the pressing spindle is distributed on the diaphragms via the pressing piece. The force is generated by springs or a pneumatic or hydraulic pressure medium, with the diaphragms either being coupled to the pressing piece or the pressing spindle depending on the respective type of construction.

The arrangement according to the invention can be utilized in all three variations of a diaphragm valve actuator.

Additional advantages, characteristics, and details of the invention are disclosed in the following description of one preferred embodiment that is illustrated in the figures; the figures schematically show FIG. 1: a cross section through part of a valve housing, and FIGS. 2a–d: the cross section according to FIG. 1 in different operating states of the valve.

According to FIG. 1, a valve housing 10 of a diaphragm valve, which is only partially illustrated in the figure so as to provide a better overview, comprises a housing cover 12 through which a coupling rod 14 passes. The coupling rod 14 passes through the sleeve 16. The sleeve 16 with an external thread 18 is inserted in a rotatable fashion in a threaded bushing 20, which is fixed in the housing cover 12 in such a way that a displacement of the sleeve 16 in the direction of its longitudinal axis z is realized by means of the screw-turning motion.

A limit stop part 22, which is situated opposite the face side 26 of the sleeve 16 forming a limit stop is attached to the side of the coupling rod 14, which is situated opposite the valve. In order to simplify the turning motion of the sleeve 16 while it is in contact with the limit stop part 22, said limit stop part is provided with an antifriction coating 24 on its side situated opposite the sleeve 16. Instead of the antifriction coating 24, it is also possible to utilize a wearing disk consisting of a material with sliding properties or an antifriction bearing.

The parts of the sleeve 16 and the coupling rod 14 with the attached limit stop part 22, which protrude out of the housing cover 12, are covered with a dome 30 consisting of a transparent material. In this case, the transparent dome 30 rests on a positioning ring 28 that encompasses the sleeve 16 and is attached onto the housing cover 12.

In order to preadjust a minimum flow cross section of the valve, the sleeve 16 is displaced in its axial direction z by turning said sleeve inside the threaded bushing 20. Due to the contact between the limit stop part 22 and the face side 26 of the sleeve 16, the coupling rod 14 is respectively displaced by the same longitudinal amount such that the minimum opening position of the valve is changed correspondingly. In order to adjust the maximum flow cross section, a limit stop surface 34 that cooperates with the face side 32 of the sleeve 16 on the side of the valve is provided on the coupling rod 14.

FIGS. 2a–d illustrate the adjustments of the sleeve 16 and the coupling rod 14 in the different operating states of the valve, which are realized via the limit stop part 22.

According to FIG. 2a, the sleeve 16 is screwed into the threaded bushing 20 to such an extent that the coupling rod 14 is lowered as far as possible, i.e., the valve is closed. In this case, the limit stop part 22 is situated at an elevation g.

According to FIG. 2b, the sleeve 16 is unscrewed from the threaded bushing 20 to such an extent that the coupling rod 14 is raised as far as possible, i.e., the valve is entirely opened. In this case, the limit stop part 22 is situated at an elevation o.

FIG. 2c shows the possibility for adjusting the maximum stroke of the coupling rod 14 such that the maximum opening position of the valve and consequently the maximum flow cross section can be limited. In the adjustment illustrated in FIG. 2c, the coupling rod 14 and consequently the valve are able to carry out the full stroke, i.e., the valve moves from its closed position to its maximum open position when actuating said valve. The limit stop part 22 consequently moves from the initial elevation g that represents the closed position to the final elevation o that represents the maximum open position. The maximum stroke of the coupling rod 14 and consequently the valve can be simply limited by additionally turning the sleeve 16 situated inside the threaded bushing 20 in the direction of the valve. This reduces the distance d between the face side 32 of the sleeve 16 that faces the valve and the limit stop surface 34 on the coupling rod 14 such that only a correspondingly reduced stroke is possible instead of the full stroke hv. Consequently, an actuation of the valve only causes said valve to open by this reduced stroke, i.e., the limit stop part 22 only moves from its initial elevation g, which represents the closed position, to an elevation that lies underneath the elevation o, which represents the maximum open position of the valve. In the adjustment illustrated in FIG. 2c, the distance d is adjusted to its maximum value, which corresponds with the amount of a full stroke hv. This also applies to all other valve adjustments in which the maximum flow cross section of the valve is desired while said valve is situated in its open position.

In the adjustment illustrated in FIG. 2d, the sleeve 16 is unscrewed from the threaded bushing 20 to such an extent that the valve is partially opened in its initial position. The minimum flow cross section of the valve resulting thereof manifests itself in the position of the limit stop part 22, which is situated at an elevation m between the elevation g, which represents the closed position, and the elevation o, which represents the maximum open position of the valve. Consequently, a partial stroke hm to the elevation m of the minimal flow cross section is attained by adjusting the sleeve 16 by the amount sm. Consequently, only a differential stroke hd up to the maximum open position of the valve remains when actuating the valve.

The adjustment of the minimum flow cross section of the valve illustrated in FIG. 2d can also be attained by screwing a limit stop part 22, which is arranged on the coupling rod 14 and realized as a nut, onto a coupling rod 14, which is realized in the form of a threaded rod. Consequently, the coupling rod 14 and the valve that is coupled with said coupling rod are raised if the limit stop part or the nut 22 is additionally screwed onto the coupling rod 14 in the direction of the valve. Consequently, the reduction of the distance d between the face side 32 of the sleeve 16 on the side of the valve and the limit stop surface 34 on the coupling rod 14 can also be realized by screwing the limit stop part or the nut 22 onto the coupling rod 14 to the corresponding extent.

Due to the two possibilities for adjusting the stroke of the coupling rod 14 and consequently the valve, it is possible to adjust the position of the sleeve 16 as well as the position of the limit stop part or the nut 22 into the open or closed actuating position of the valve by means of a corresponding preadjustment in such a way that the valve can be actuated between a first position with a preadjusted minimum flow cross section and a second position with a preadjusted maximum flow cross section.

FIGS. 2a–d, in particular, clarify that any arbitrary preadjustment of the valve can be simply realized externally by changing the position of the sleeve 16 in the threaded bushing 20 or the position of the limit stop part 22 on the coupling rod 14. In addition, the respective operating position of the valve can be easily ascertained at any time by the position of the sleeve 16 and the limit stop part 22.

We claim:

1. A valve actuator comprising a housing, a cover mounted to said housing, and a coupling rod axially movably mounted in said housing, said coupling rod being axially movable in a first axial opening direction to a first, valve open position, and axially movable in a first axial opening direction to a first, valve open position, and axially movable in a second closing direction opposite said first direction to a second, valve closed position, said movement of said coupling rod defining the stroke of the coupling rod, and means for adjustably setting the axial distance between said first position and said second position to adjustably regulate the stroke of said coupling rod, said means comprising a sleeve axially adjustably mounted ins aid housing, said coupling rod being axially movable within said sleeve and having a first limit member engaging with said sleeve and said cover to limit movement of said coupling rod in said first axial opening direction and a second limit member engaging with said sleeve to limit movement of said coupling rod in said second axial closing direction and means for adjustably positioning said sleeve in said housing to thereby vary the points in the axial positions of said coupling rod at which said limit members engage said sleeve.

2. The valve actuator as defined in claim 1 and said sleeve being exteriorly threaded and said housing having an interiorly threaded portion receiving said sleeve whereby said sleeve is axially adjustably mounted with respect to said housing.

3. The valve actuator as defined in claim 1 and further comprising said coupling rod having an end portion extending outwardly of said housing, said cover being transparent and covering said end portion of said coupling rod and is part of an indicator whereby said end portion of said coupling rod is visible through said transparent cover to indicate the position of said coupling rod.

4. The valve actuator as defined in claim 1 and including means for adjustably axially positioning said second limit member with respect to said coupling rod to permit adjustment of the valve closed position of said coupling rod.

5. The valve actuator as defined in claim 4 and in which said last mentioned means comprises one end of said coupling rod being threaded and a nut adjustably received by said coupling rod, said nut having a face engageable with said sleeve at a predetermined axial position of said coupling rod with respect to said sleeve.

6. A valve actuator comprising a housing, a transparent cover, and a coupling rod axially movably mounted in said housing and having an end portion extending outwardly from said housing into said cover, said coupling rod being axially movable in a first axial opening direction to a first, valve open position, and axially movable in a second closing direction opposite said first direction to a second, valve closed position, said movement of said coupling rod defining the stroke of the coupling rod, and means for adjustably setting the axial distance between said first position and said second position to adjustably regulate the stroke of said coupling rod, said means comprising a sleeve axially adjustably mounted in said housing, said coupling rod being axially movable within said sleeve and having a first limit member engaging with said sleeve to limit movement of a s aid coupling rod in said first axial opening direction and a second limit member engaging with said sleeve to limit movement of said coupling rod in said second axial closing direction and means for adjustably positioning said sleeve in said housing to thereby vary the points in the axial positions of said coupling rod at which said limit members engage said sleeve, said end portion of said coupling rod being visible within transparent cover to indicate the position of said coupling rod.

7. The valve actuator as defined in claim 6 and including means for adjustable axially positioning said second limit member with respect to said coupling rod to permit adjustment of the valve closed position of said coupling rod.

8. The valve actuator as defined in claim 7 and in which said last mentioned means comprises one end of said coupling rod being threaded and a nut adjustably received by said coupling rod, said nut having a face engageable with said sleeve at a predetermined axial position of said coupling rod with respect to said sleeve.

* * * * *